United States Patent
Kahrobaiyan

(10) Patent No.: US 12,085,894 B2
(45) Date of Patent: Sep. 10, 2024

(54) FLEXIBLE GUIDE WITH TRANSLATION TABLE FOR A ROTATING RESONATOR MECHANISM, IN PARTICULAR FOR A HOROLOGICAL MOVEMENT

(71) Applicant: The Swatch Group Research and Development Ltd, Marin (CH)

(72) Inventor: Mohammad Hussein Kahrobaiyan, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 390 days.

(21) Appl. No.: 17/486,010

(22) Filed: Sep. 27, 2021

(65) Prior Publication Data

US 2022/0137560 A1    May 5, 2022

(30) Foreign Application Priority Data

Oct. 29, 2020    (EP) ..................................... 20204749

(51) Int. Cl.
*G04B 17/04*    (2006.01)
*G04B 17/26*    (2006.01)

(52) U.S. Cl.
CPC ........... *G04B 17/045* (2013.01); *G04B 17/26* (2013.01)

(58) Field of Classification Search
CPC ...... G04B 17/045; G04B 17/26; G04B 17/32; G04B 17/0632
USPC ....................................................... 368/168
See application file for complete search history.

(56) References Cited

U.S. PATENT DOCUMENTS

| 2013/0176829 A1* | 7/2013 | Cusin ..................... G04B 15/00 368/127 |
| 2020/0033805 A1* | 1/2020 | Di Domenico ...... G04B 17/045 |
| 2020/0150595 A1* | 5/2020 | Winkler ............... G04B 17/045 |

FOREIGN PATENT DOCUMENTS

| CN | 109307998 | 2/2019 |
| CN | 111158230 A | 5/2020 |
| EP | 3 435 172 A2 | 1/2019 |
| EP | 3 438 762 A2 | 2/2019 |

(Continued)

OTHER PUBLICATIONS

Thalmann, Etienne, Flexure Pivot Oscillators for Mechanical Watches (Jun. 2020) (Year: 2020).*

(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A flexible guide for a rotating resonator mechanism, in particular of a horological movement, the guide including a fixed support, an element that is capable of moving relative to the fixed support, at least two main flexible blades allowing the movable element to move relative to the fixed support by bending the main flexible blades via a rotary motion about a centre of rotation, the flexible guide being arranged substantially in one plane, the flexible guide including at least two translation tables, each joined to one end of a main flexible blade, such that each translation table is configured to move in translation at least in part under the effect of the bending of the corresponding main flexible blade, the flexible guide including at least one tertiary flexible blade connecting the two translation tables.

13 Claims, 4 Drawing Sheets

(56) References Cited

FOREIGN PATENT DOCUMENTS

| EP | 3 722 888 A1 | 10/2020 | |
| WO | WO-2020016131 A1 * | 1/2020 | ........... G04B 17/045 |

OTHER PUBLICATIONS

Office Action issued Oct. 11, 2022, in corresponding Japanese Patent Application No. 2021-163283 (with English Translation), 9 pages.
Etienne Frederic Gabriel Thalmann, "Flexure Pivot Oscillators for Mechanical Watches", EPFL science publications, 8802, Switzerland, EPFL science publications, Jun. 11, 2020, pp. 1, 25 and 35, infoscience.epfl.ch/record/277802,8802.
European Search Report issued Mar. 5, 2021 in European Application 20204749.4, filed on Oct. 29, 2020, 3 pages (with English Translation of Categories of Cited Documents).
Thalmann, E., "Flexure Pivot Oscillators for Mechanical Watches" In: "Flexure Pivot Oscillators for Mechanical Watches" (2020), 125 pages.
EPFL (CPME2143776): Flexure Pivot Oscillators for Mechanical Watches; Jun. 11, 2020, Etienne Frédéric Gabriel THALMANN (20 pages).
Chinese Office Action issued Jun. 26, 2024, in Chinese Patent Application No. 202111272945.5, filed Oct. 29, 2021; citing documents 15-18 and 23 therein, 11 pages.

* cited by examiner

FLEXIBLE GUIDE WITH TRANSLATION TABLE FOR A ROTATING RESONATOR MECHANISM, IN PARTICULAR FOR A HOROLOGICAL MOVEMENT

CROSS-REFERENCE TO RELATED APPLICATION

This application claims priority to European Patent Application No. 20204749.4 filed on Oct. 29, 2020, the entire disclosure of which is hereby incorporated herein by reference.

FIELD OF THE INVENTION

The present invention relates to a flexible guide with a translation table for a rotating resonator mechanism, in particular for a horological movement. The invention further relates to a rotating resonator mechanism provided with such a flexible guide.

BACKGROUND OF THE INVENTION

Most mechanical watches today are equipped with a sprung balance and a Swiss lever escapement mechanism. The sprung balance constitutes the time base of the watch. It is also referred to as a resonator.

The escapement has two main functions:
to maintain the two-and-fro motions of the resonator;
to count these to-and-fro motions.

An inertial element, a guide and an elastic return element are required in order to constitute a mechanical resonator. Conventionally, a balance spring acts as an elastic return element for the inertial element constituted by a balance. This balance is guided in rotation by pivots which rotate inside plain ruby bearings. This leads to friction, and thus to energy losses and running disturbances, which are position-dependent and which should ideally be eliminated.

Flexible guides are currently used as a spring to form a virtual pivot. Virtual-pivot flexible guides allow horological resonators to be substantially improved. The simplest thereof are cross-blade pivots, consisting of two guiding devices with straight blades that cross one another, generally at right angles. These two blades can be either three-dimensional in two different planes, or two-dimensional in the same plane and are thus as if welded at the point of intersection therebetween.

However, isochronous motion cannot be obtained when looking to use flexible blades to pivot a rotating annular balance in a manner similar to the motion of a balance with a balance spring. More specifically, a perfectly periodic rotary motion of the weight cannot be obtained. The return torque is non-linear, which results in anisochronism as a function of the amplitude of the displacement of the weight and a rate variation of the movement.

SUMMARY OF THE INVENTION

One purpose of the invention is thus to propose a flexible guide for a rotating resonator mechanism that does not suffer from the aforementioned problems.

To this end, the invention relates to a flexible guide for a rotating resonator mechanism, in particular of a horological movement, the guide comprising a fixed support, an element that is capable of moving relative to the fixed support, and at least two main flexible blades allowing the movable element to move relative to the fixed support by bending the main flexible blades via a rotary motion about a centre of rotation, the flexible guide being arranged substantially in one plane.

The flexible guide is noteworthy in that it comprises at least two translation tables, each joined to one end of a main flexible blade, such that each translation table is configured to move in translation at least in part under the effect of the bending of the corresponding main flexible blade, the flexible guide comprising at least one tertiary flexible blade connecting the two translation tables.

The invention thus provides an isochronous flexible-blade guide. More specifically, the translation table allows the main blade to move as it bends, thus maintaining a substantially constant return coefficient. Such a flexible guide guarantees an isochronous motion.

According to one advantageous embodiment, the guide comprises at least three pairs, each pair being formed by a main blade and a translation table, the pairs being angularly distributed so as to form a symmetrical pivot, the guide comprising at least two tertiary flexible blades, preferably three tertiary flexible blades, connecting the translation tables in pairs.

According to one advantageous embodiment, each translation table is arranged in series between the fixed support and said corresponding main flexible blade, the translation table being joined to the fixed support and to a first end of the main flexible blade, the main flexible blade being joined to the movable element at a second end.

According to one advantageous embodiment, each translation table is arranged in series between said corresponding main flexible blade and the movable element, the translation table being joined to the movable element and to the second end of the main flexible blade, the main flexible blade being joined to the fixed support at the first end.

According to one advantageous embodiment, the movable element comprises a central part of the flexible guide.

According to one advantageous embodiment, the fixed support comprises the central part of the flexible guide.

According to one advantageous embodiment, the main translation table comprises at least one secondary flexible blade, preferably two secondary flexible blades, and a rigid part, the secondary flexible blade being joined at one end to the rigid part and at another end either to the fixed support or to the movable element.

According to one advantageous embodiment, the secondary flexible blades are disposed in different rows.

According to one advantageous embodiment, the secondary flexible blades are substantially parallel.

According to one advantageous embodiment, the flexible guide comprises at least one secondary translation table arranged in series between two main translation tables, each secondary translation table being connected to two main translation tables by one tertiary flexible blade per main translation table.

According to one advantageous embodiment, the secondary translation table comprises a quaternary flexible blade, preferably two quaternary flexible blades, and a rigid part, the quaternary flexible blades being joined to the rigid part of the secondary translation tables at one end and at another end either to the fixed support or to the movable element.

According to one advantageous embodiment, the quaternary flexible blades are disposed in different rows.

According to one advantageous embodiment, the quaternary flexible blades are substantially parallel.

According to one advantageous embodiment, the tertiary flexible blades are joined to the rigid parts of the two translation tables connected thereby.

According to one advantageous embodiment, the rigid part forms a bend such that the one or more main flexible blades are substantially perpendicular to the one or more secondary flexible blades of the translation table joined to the main flexible blade when the guide is in the rest position.

According to one advantageous embodiment, the movable element comprises a balance.

According to one advantageous embodiment, a translation table is connected to only one main blade.

According to one advantageous embodiment, a tertiary blade connects only two translation tables to one another.

The invention further relates to a rotating resonator mechanism, in particular for a horological movement, the mechanism including a flexible guide according to the invention.

BRIEF DESCRIPTION OF THE DRAWINGS

Other features and advantages of the present invention will appear after reading the plurality of embodiments, which are provided for purposes of illustration only and not intended to limit the scope of the invention, given with reference to the accompanying drawings, wherein.

DETAILED DESCRIPTION OF PREFERRED EMBODIMENTS

Figure 1:
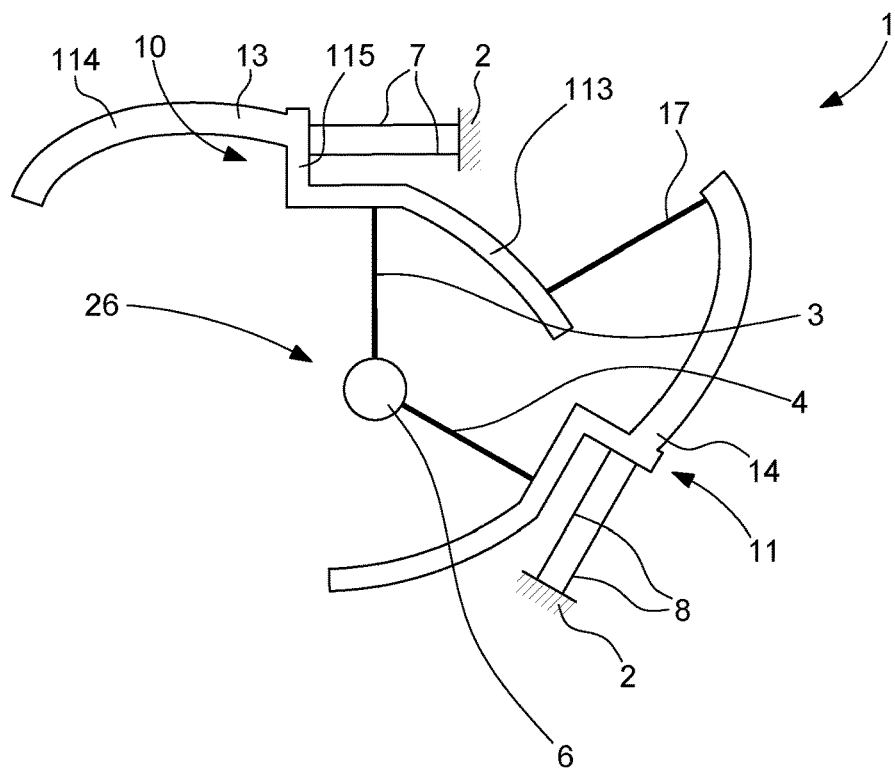
FIG. 1 is a diagrammatic, overhead view of a flexible guide according to a first embodiment of the invention.

FIG. 1 shows a first embodiment of a flexible guide 1 for a rotating resonator mechanism, in particular of a horological movement. The flexible guide 1 is arranged substantially in one plane. The flexible guide comprises a fixed support 2, an element 26 that is capable of moving relative to the fixed support 2 and two main flexible blades 3, 4. The main flexible blades 3, 4 allow the movable element 20 to move relative to the fixed support 2. By bending the main flexible blades 3, 4, the movable element 20 can move relative to the support 2 in a rotary motion about itself around a centre of rotation. The main blades 3, 4 are preferably of the same length and angularly distributed evenly about a central part 6 of the movable element 20 and of the flexible guide 1, so as to form a symmetrical pivot.

According to the invention, the flexible guide 1 comprises two translation tables 10, 11, each translation table being joined to one end of a different main flexible blade 3, 4. In this embodiment, each translation table 10, 11 is arranged in series between the fixed support 2 and said corresponding main flexible blade 3, 4. The translation table 10, 11 is joined to the fixed support 2 and to a first end of the corresponding main flexible blade 3, 4, the main flexible blade 3, 4 being joined to the central part 6 by a second end.

Thus, the flexible guide 1 comprises two pairs, each pair consisting of a main flexible blade 3, 4 and a translation table 10, 11. The pairs are angularly distributed about the central part 6, each main blade 3, 4 being joined at one end to the central part 6 and the translation table 10, 11 being joined to the fixed support 2. The pairs, in particular the main blades 3, 4, form for example an angle of about 120° with one another. The central part 6 is for example a portion of a circular cylinder. In this embodiment, the movable element 20 comprises the central part 6.

Each translation table 10, 11 is configured to move in translation at least in part under the effect of the motion of the main flexible blade 3, 4. Each translation table 10, 11 comprises at least one secondary flexible blade 7, 8, in this case two substantially parallel secondary flexible blades 7, 8, and a rigid part 13, 14. The secondary flexible blades 7, 8 are disposed in different rows. Preferably, the secondary flexible blades 7, 8 are joined at one end to the same face of the rigid part 13, 14, and at another end to the fixed support 2. The rigid part 13, 14 forms a right-angled bend, the bend including three segments 113, 114, 115 joined together at the ends thereof. The second middle segment 115 is substantially perpendicular to the other two segments 113, 114. The first segment 113 and the third segment 114 are curved at the free ends to retain a substantially concentric shape for the guide 1. The first segment 113 and the third segment 114 of each translation table 10, 11 are long enough that the end of the third segment 114 of a first table and the free end of the first segment 113 of a second adjacent table are superimposed relative to the centre of the flexible guide 1.

The guide 1 comprises a tertiary flexible blade 17 connecting the two translation tables 10, 11. The tertiary flexible blade 17 is joined to the rigid parts 13, 14 of the translation tables 10, 11. More particularly, the tertiary flexible blade 17 connects the end of the third segment 114 of a first table 11 with the end of the first segment 113 of the second table 10. The tertiary flexible blade 17 is directed in a radial direction through the centre of the flexible guide 1 when the guide 1 is in the rest position.

The tertiary flexible blade 17 prevents the translation tables 10, 11 from moving due to gravity. More specifically, when one table 10, 11 moves towards the centre of the guide 1, the other table 10, 11 also moves towards the centre thanks to the tertiary flexible blade 17. Conversely, the translation tables 10, 11 move together towards the periphery of the guide 1 by means of the tertiary flexible blade 17. Thus, the tables 10, 11 follow the same displacement with respect to the centre of the guide 1. This improves the accuracy of the rate of the movement, which is less sensitive to gravity.

The main flexible blade 3, 4 is joined to the first segment 113, whereas the secondary blades 7, 8 are joined to the second segment 115. Thus, the main flexible blades 3, 4 are substantially perpendicular to the secondary flexible blades 7, 8 of the translation table 10, 11 when the guide 1 is in the rest position. The rest position is defined as being when the main blades 3, 4 and the secondary blades 7, 8 are straight, i.e. not bent.

The movable element 26 further comprises a balance, not shown in the figure, which is for example ring-shaped. The balance includes an outer annular part and arms, for example three arms, joining the annular part to a joint that is axial to the annular part. The arms are concentric and of equal length. The balance is assembled on the central part 6 by the joint. Preferably, the central part and the joint are made in one piece. Thus, the balance is centred relative to the central part 6. In this alternative embodiment, the balance is made of the same material, i.e. it is made in one piece.

When the balance is in motion, it follows, within the plane of the balance, a periodic rotational motion in one direction, then in the other direction, about an axis passing through the joint and the central part 6. The main flexible blades 3, 4 bend and act as a return spring for the balance to rotate it in the other direction and vice versa. The translation tables 10, 11 allow the main blades 3, 4 to move longitudinally as they bend. The rigid parts 13, 14 of the translation tables 10, 11 move towards the central part 6 by means of the secondary blades 7, 8 when the main blades 3, 4 bend, and move away from the central part 6 when the main blades 3, 4 straighten. This ensures that the motion of the balance remains isochronous thanks to the translation tables 10, 11. Preferably, the tertiary blade 17 is oriented along the bisector of the angle formed between the main blades 3, 4 when the guide 1 is in the rest position. Equivalently, the tertiary blade 17 is preferably oriented along the bisector of the angle formed between the directions of the blades of the translation tables 10, 11.

Figure 2:
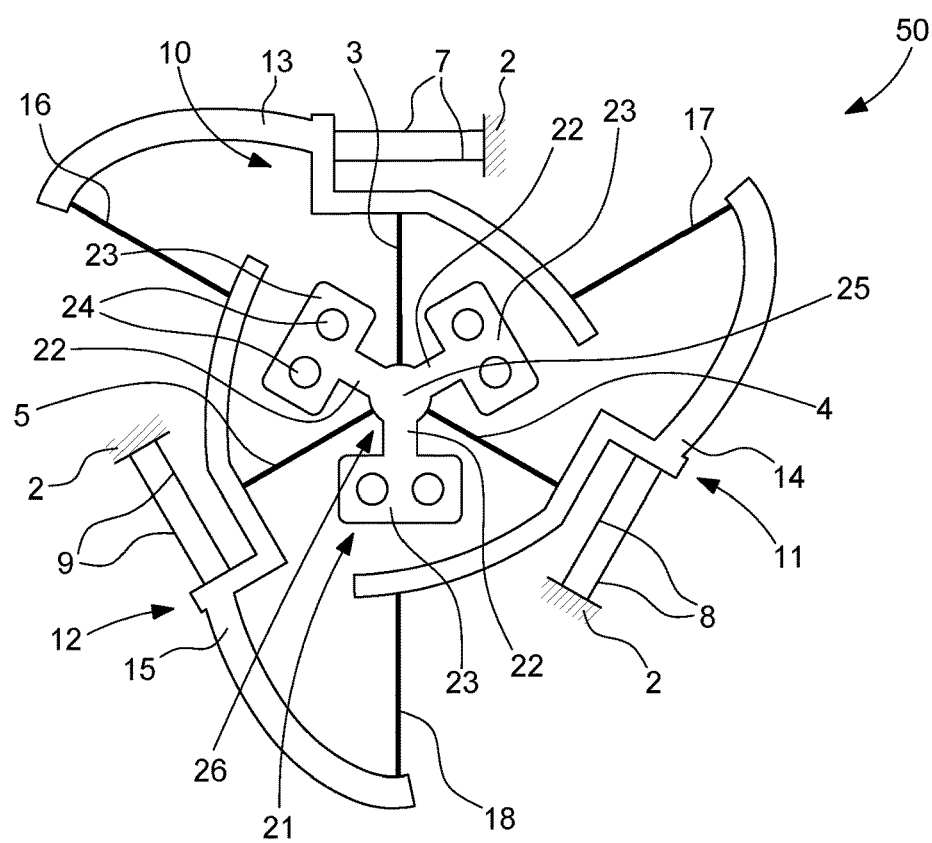
FIG. 2 is a diagrammatic, overhead view of a flexible guide according to a second embodiment of the invention.

FIG. 2 shows a second embodiment of a flexible guide 50 for a rotating resonator mechanism, in particular of a horological movement. The flexible guide 50 is arranged substantially in one plane. The flexible guide comprises a fixed support 2, an element 26 that is capable of moving relative to the fixed support 2 and three main flexible blades 3, 4, 5. The main flexible blades 3, 4, 5 allow the movable element 20 to move relative to the fixed support 2. By bending the main flexible blades 3, 4, 5, the movable element 20 can move relative to the support 2 in a rotary motion about itself around a centre of rotation. The main blades 3, 4, 5 are preferably of the same length and angularly distributed evenly about a central part 6 of the movable element 20 and of the flexible guide 1, so as to form a symmetrical pivot.

According to the invention, the flexible guide 1 comprises translation tables 10, 11, 12, each translation table being joined to one end of a different main flexible blade 3, 4, 5. In this embodiment, each translation table 10, 11, 12 is arranged in series between the fixed support 2 and said corresponding main flexible blade 3, 4, 5. The translation table 10, 11, 12 is joined to the fixed support 2 and to a first end of the corresponding main flexible blade 3, 4, 5, the main flexible blade 3, 4, 5 being joined to the central part 6 by a second end.

Thus, the flexible guide 1 comprises three pairs, each pair consisting of a main flexible blade 3, 4, 5 and a translation table 10, 11, 12. The pairs are angularly distributed about the central part 6, so as to form a symmetrical pivot, each main blade 3, 4, 5 being joined at one end to the central part 6 and the translation table 10, 11, 12 being joined to the fixed support 2. The pairs, in particular the main blades 3, 4, 5, form an angle of about 120° with one another. The central part 6 is for example a portion of a circular cylinder. In this embodiment, the movable element 20 comprises the central part 6.

Each translation table 10, 11, 12 is configured to move in translation at least in part under the effect of the motion of the main flexible blade 3, 4, 5. Each translation table 10, 11, 12 comprises at least one secondary flexible blade 7, 8, 9, in this case two substantially parallel secondary flexible blades 7, 8, 9, and a rigid part 13, 14, 15. The secondary flexible blades 7, 8, 9 are disposed in different rows. Preferably, the secondary flexible blades 7, 8 are joined at one end to the rigid part 13, 14, 15, and at another end to the fixed support 2. The rigid part 13, 14, 15 forms a right-angled bend, the bend including three segments 113, 114, 115 joined together at the ends thereof. The second middle segment 115 is substantially perpendicular to the other two segments 113, 114. The first segment 113 and the third segment 114 are curved at the free ends to retain a substantially concentric shape for the guide 1. The first segment 113 and the third segment 114 of each translation table 10, 11, 12 are long enough that the end of the third segment 114 of a first table and the free end of the first segment 113 of a second adjacent table are superimposed relative to the centre of the flexible guide 1.

The guide 1 comprises three tertiary flexible blades 16, 17, 18, each tertiary flexible blade 16, 17, 18 connecting two different translation tables 10, 11, 12. The tertiary flexible blades 16, 17, 18 are joined to the rigid parts 13, 14, 15 of the translation tables 10, 11, 12. More particularly, the tertiary flexible blades 16, 17, 18 connect the end of the third segment 114 of a first table 10, 11, 12 with the end of the first segment 113 of the second table 10, 11, 12. The tertiary flexible blades 16, 17, 18 are directed in a radial direction through the centre of the flexible guide 1 when the guide 1 is in the rest position.

The tertiary flexible blades 16, 17, 18 prevent the translation tables 10, 11, 12 from moving due to gravity. More specifically, when one table 10, 11, 12 moves towards the centre of the guide 1, the other tables 10, 11, 12 also move towards the centre thanks to the tertiary flexible blades 16, 17, 18. Conversely, the translation tables 10, 11, 12 move together towards the periphery of the guide 1 by means of the tertiary flexible blades 16, 17, 18. Thus, the tables 10, 11, 12 follow the same displacement with respect to the centre of the guide 1. This improves the accuracy of the rate of the movement, which is less sensitive to gravity.

The main flexible blade 3, 4, 5 is joined to the first segment 113, whereas the secondary blades 7, 8, 9 are joined to the second segment 115. Thus, the main flexible blades 3, 4, 5 are substantially perpendicular to the secondary flexible blades 7, 8, 9 of the translation table 10, 11, 12 when the guide 1 is in the rest position. The rest position is defined as being when the main blades 3, 4, 5 and the secondary blades 7, 8, 9 are straight, i.e. not bent.

The balance is assembled on the central part 6 by the joint. Preferably, the central part and the joint are made in one piece. Thus, the balance is centred relative to the central part 6. In this alternative embodiment, the balance is made of the same material, i.e. it is made in one piece.

In this embodiment, the movable element 26 includes at least two members forming a balance. The first member 21 comprises arms 22, in this case three arms, and an axial joint 25 made in one piece. The arms 22 are concentric and of equal length. The arms 22 are equipped, at the free ends thereof, with an attachment platform 23 provided with holes 24 for assembling a ring, the ring defining the second member of the movable element 26 and not shown in FIG. 2. Preferably, the central part 6 and the axial joint 25 of the first member 21 are made in one piece.

When the balance is in motion, it follows, within the plane of the balance, a periodic rotational motion in one direction, then in the other direction, about an axis passing through the joint and the central part 6. The main flexible blades 3, 4, 5 bend and act as a return spring for the balance to rotate it in the other direction and vice versa. The translation tables 10, 11, 12 allow the main blades 3, 4, 5 to move longitudinally as they bend. The rigid parts 13, 14, 15 of the translation tables 10, 11, 12 move towards the central part 6 by means of the secondary blades 7, 8, 9 when the main blades 3, 4, 5 bend, and move away from the central part 6 when the main blades 3, 4, 5 straighten. This ensures that the motion of the balance remains isochronous thanks to the translation tables 10, 11, 12. Preferably, the tertiary blades 16, 17, 18 are oriented along the bisectors of the angles formed between the main blades 3, 4, 5. Equivalently, the tertiary blades 16, 17, 18 are preferably oriented along the bisectors of the angles formed between the directions of the blades of the translation tables 10, 11, 12.

Figure 3:
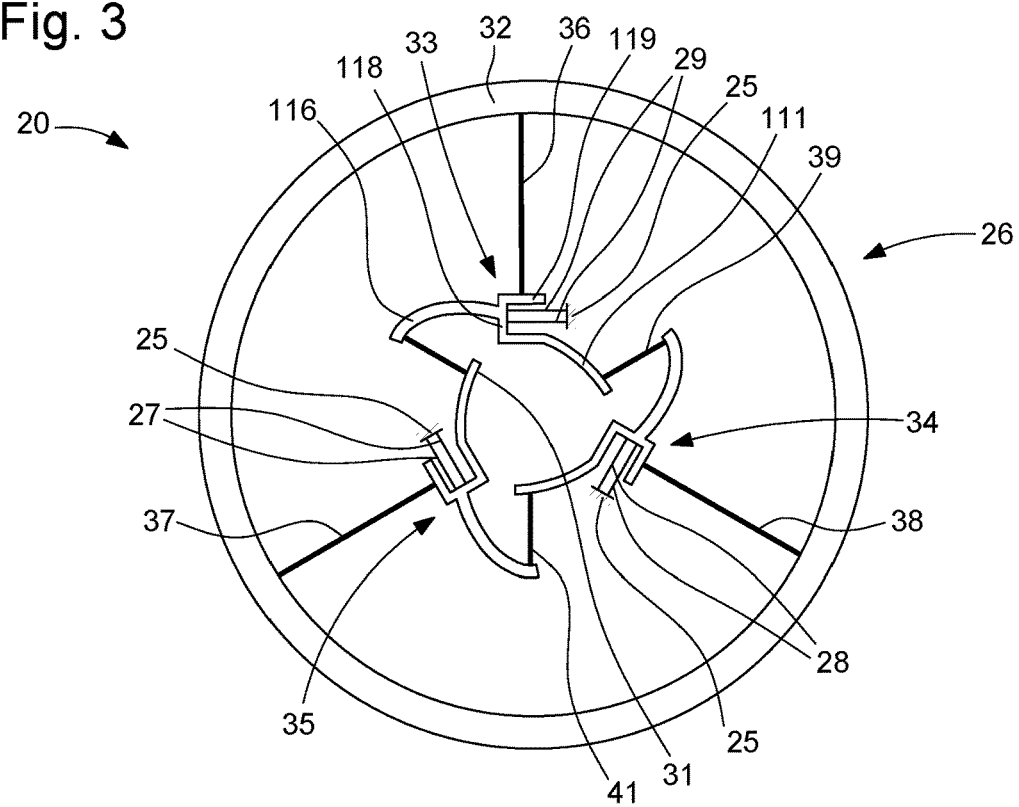
FIG. 3 is a diagrammatic, overhead view of a flexible guide according to a third embodiment of the invention.

The third embodiment in FIG. 3 shows an example of a flexible guide 20 that does not include a central part as in the second embodiment. The flexible guide 20 comprises a fixed support 25, a balance 32 of a movable element 26, and three pairs consisting of a main flexible blade 36, 37, 38 and a translation table 33, 34, 35. Each main blade 36, 37, 38 is joined at a first end to the balance 32, and at a second end to a rigid part of a translation table 33, 34, 35. The pairs are angularly distributed so that there is an angle of 120° between the main blades 36, 37, 38. Each translation table 33, 34, 35 is arranged in series between a main flexible blade 36, 37, 38 and the fixed support 25. The translation table 33, 34, 35 is joined to the fixed support 25 and to the second end of the main flexible blade 36, 37, 38. The balance 32 is arranged about the translation tables 33, 34, 35. Thus, the translation tables 33, 34, 35 are in the centre of the flexible guide 20 and the balance 26 at the periphery. The translation tables 33, 34, 35 have the same structure, the same disposition relative to one another, and the same shape as the translation tables of the second embodiment. The secondary blades 27, 28, 29 of the translation tables 33, 34, 35 are substantially perpendicular to the main blades 36, 37, 38. The rigid parts of the translation tables 33, 34, 35 include four segments, the first three segments 116, 117, 118 are disposed in the same way as in the second embodiment, whereas the fourth segment 119 is assembled with the second segment 118, which is perpendicular to the other two segments 116, 117. The fourth segment 119 is substantially parallel to the third segment 117 and to the corresponding secondary blades 27, 28, 29. The third segment 117 and the fourth segment 119 are arranged on either side of the secondary blades 27, 28, 29. The main blades 36, 37, 38 are connected to the translation tables 10, 11, 12 by the fourth segment 119. Preferably, the tertiary blades 31, 39, 41 are preferably oriented along the bisectors of the angles formed between the main blades 36, 37, 38. Equivalently, the tertiary blades 31, 39, 41 are preferably oriented along the bisectors of the angles formed between the directions of the translation tables 33, 34, 35.

Figure 4:
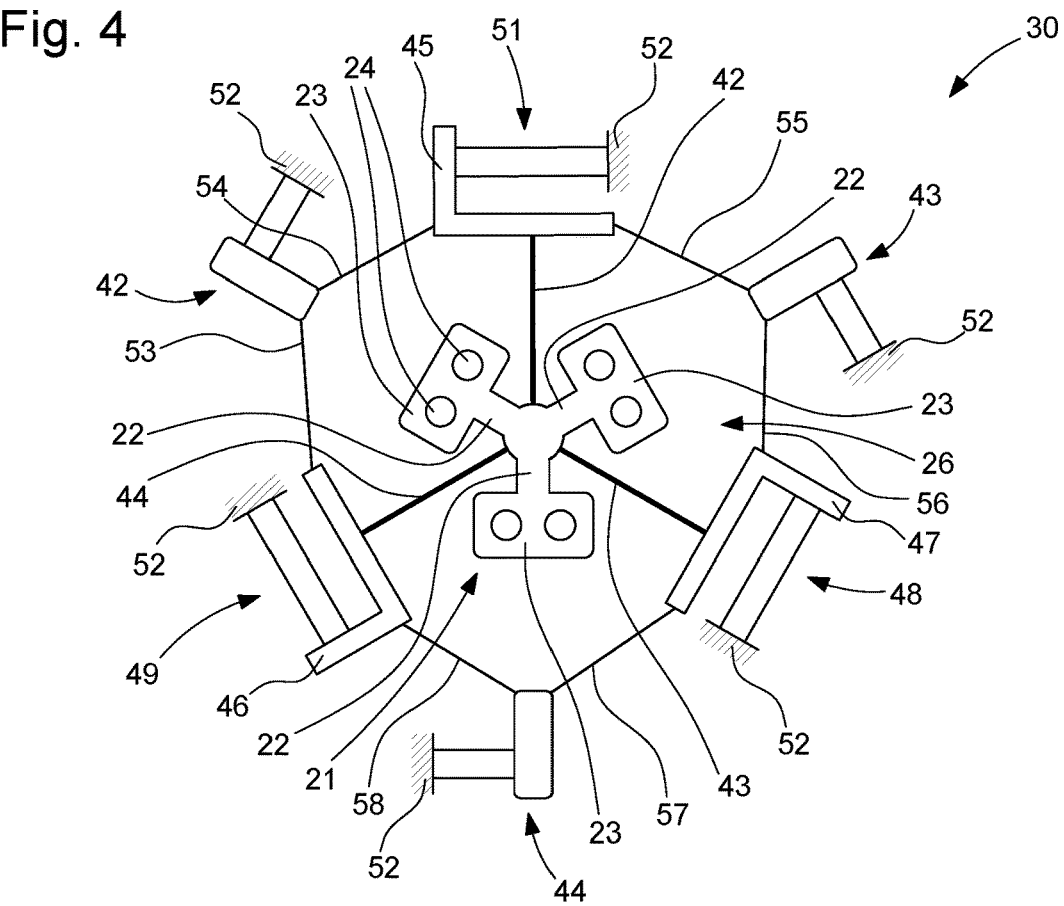
FIG. 4 is a diagrammatic, overhead view of a flexible guide according to a fourth embodiment of the invention.

The fourth embodiment of the flexible guide 30 shown in FIG. 4 comprises a fixed support 52, an element 26 that is capable of moving relative to the fixed support 52 and three main flexible blades 42, 43, 44 allowing the movable element 20 to move relative to the fixed support 52. By bending the main flexible blades 42, 43, 44, the movable element 20 can move relative to the support 52 in a rotary motion about itself around a centre of rotation. The main blades 42, 43, 44 are preferably of the same length and angularly distributed evenly about a central part of the movable element 26, so as to form a symmetrical pivot.

The flexible guide 30 comprises translation tables 48, 49, 51, each translation table being joined to one end of a different main flexible blade 42, 43, 44. In this embodiment, the translation table 48, 49, 51 is arranged in series between the fixed support 52 and said corresponding main flexible blade 42, 43, 44. The translation table 48, 49, 51 is joined to the fixed support 52 and to a first end of the corresponding main flexible blade 42, 43, 44, the main flexible blade 42, 43, 44 being joined to the movable element 26 by a second end.

Thus, the flexible guide 30 comprises three pairs, each pair consisting of a main flexible blade 42, 43, 44 and a translation table 48, 49, 51. The pairs are angularly distributed about the movable element 26, so as to form a symmetrical pivot, each main blade 42, 43, 44 being joined at one end to the central part 6 and the translation table 48, 49, 51 being joined to the fixed support 52. The pairs, in particular the main blades 42, 43, 44, form an angle of about 120° with one another.

Each translation table 48, 49, 51 is configured to move in translation at least in part under the effect of the motion of the main flexible blade 42, 43, 44. Each translation table 48, 49, 51 comprises at least one secondary flexible blade, in this case two secondary flexible blades, and a rigid part 45, 46, 47. The secondary flexible blades are joined at one end to the rigid part 45, 46, 47, and at another end to the fixed support 52. In this case, the rigid part 45, 46, 47 forms a right-angled bend, the bend including two substantially perpendicular segments. The main flexible blade 42, 43, 44 is joined to the first segment, whereas the secondary blades are joined to the second segment. Thus, the main flexible blades 42, 43, 44 are substantially perpendicular to the secondary flexible blades of the translation table 48, 49, 51 when the guide 30 is in the rest position. The rest position is defined as being when the main blades 42, 43, 44 and the secondary blades are straight, i.e. not bent.

The movable element 26 includes at least two members. The first member 21 comprises arms 22, in this case three arms, and an axial joint 25 made in one piece. The arms 22 are equipped, at the free ends thereof, with an attachment platform 23 provided with holes 24 for assembling an inertial element, such as an inertia-block or a ring preferably, the inertial element defining the second member and not shown in FIG. 4. Preferably, the central part 6 and the first member 21 are made in one piece.

Moreover, the flexible guide 30 comprises at least one secondary translation table 42, 43, 44, arranged in series between two main translation tables. In FIG. 4, the flexible guide 30 comprises three secondary translation tables 42, 43, 44. Each secondary translation table 42, 43, 44 is disposed between two translation tables 48, 49, 51. A secondary translation table 42, 43, 44 comprises two quaternary flexible blades and a rigid part, the quaternary flexible blades being joined to the rigid part of the secondary translation tables. The quaternary flexible blades are substantially parallel and are disposed in different rows. Preferably, the secondary flexible blades are joined to the same face of the rigid part.

Each secondary translation table 42, 43, 44 is connected to two main translation tables 48, 49, 51 by a tertiary flexible blade 53, 54, 55, 56, 57, 58. A tertiary flexible blade 53, 54, 55, 56, 57, 58 connects a main translation table 48, 49, 51 to a secondary translation table 42, 43, 44. A secondary translation table 42, 43, 44 comprises two tertiary flexible blades and a rigid part. The rigid part in this case has a parallelepiped shape, which is oriented towards the centre of the flexible guide 30. The quaternary flexible blades connect the rigid part of the secondary translation table to the support 52. The flexible guide 30 thus comprises tertiary flexible blades 53, 54, 55, 56, 57, 58 connecting the secondary translation tables 42, 43, 44 to the main translation tables 48, 49, 51. Each tertiary flexible blade 53, 54, 55, 56, 57, 58 connects a secondary translation table 42, 43, 44 to an adjacent main translation table 48, 49, 51. The tertiary flexible blades 53, 54, 55, 56, 57, 58 are joined to the rigid part 45, 46, 47 of the main translation tables 48, 49, 51, preferably to the segment of the rigid part 45, 46, 47 perpendicular to the main flexible blades 42, 43, 44 The tertiary flexible blades 53, 54, 55, 56, 57, 58 are substantially of equal length. Each secondary translation table 42, 43, 44 is arranged equidistant from the two main translation tables 48, 49, 51 to which it is joined. The secondary translation tables 42, 43, 44 can move in a direction towards the centre of the flexible guide 30. The secondary translation tables 42, 43, 44 further improve the accuracy of the rate of the flexible guide 30 as regards the effects of gravity.

Figure 5:
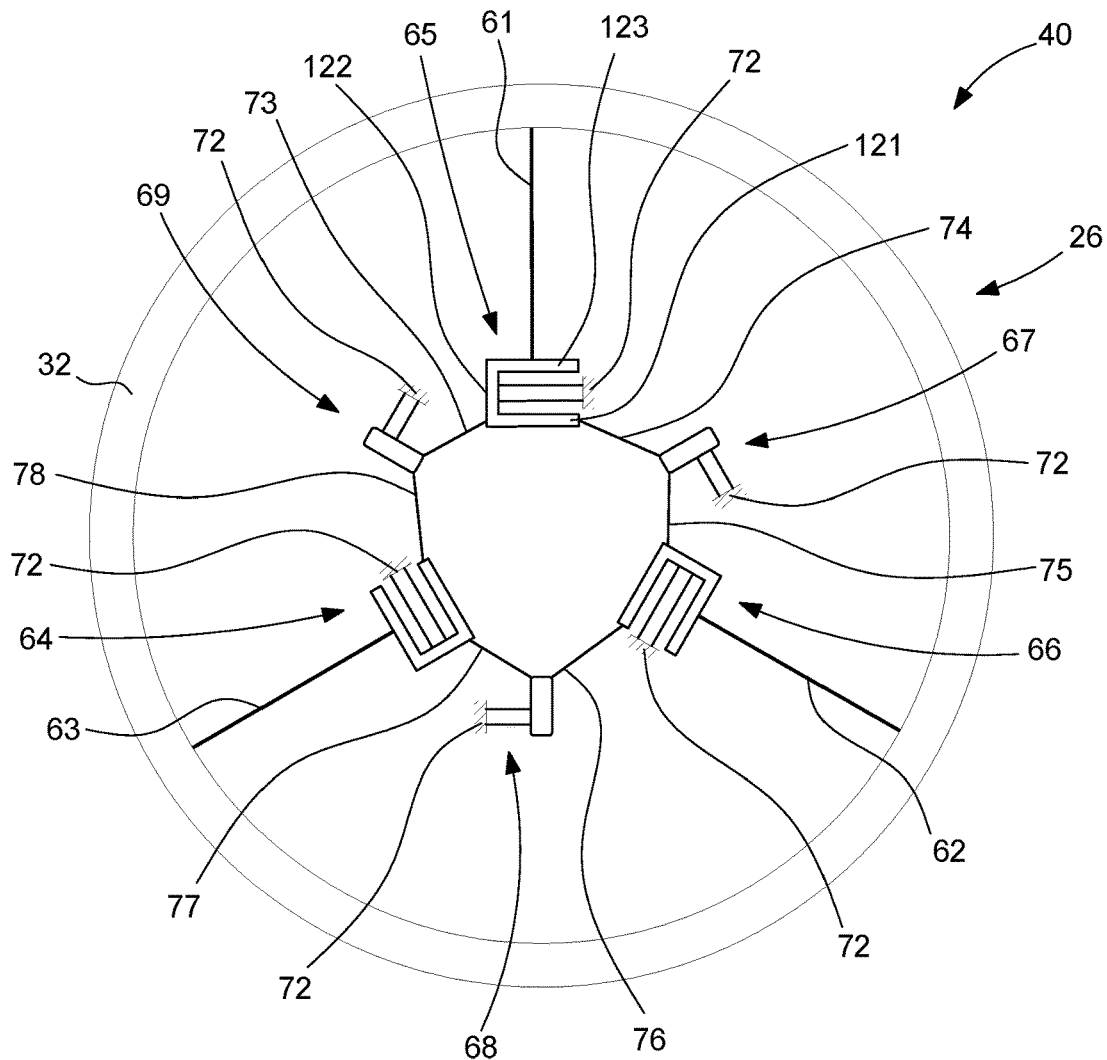
FIG. 5 is a diagrammatic, overhead view of a flexible guide according to a fifth embodiment of the invention.

The embodiment of the flexible guide 40 in FIG. 5 also comprises main translation tables 64, 65, 66 and secondary translation tables 67, 68, 69, but it comprises a movable element 26 arranged at the periphery of the flexible guide 40, and does not comprise a central part as in the embodiment shown in FIG. 3. The arrangement of the main translation tables 64, 65, 66 and of the secondary translation tables 67, 68, 69 is the same as that of the embodiment shown in FIG. 4.

The flexible guide 40 comprises a fixed support 72, an element 26 that is capable of moving relative to the fixed support 72 and three main flexible blades 61, 62, 63 allowing the movable element 26 to move relative to the fixed support 72. By bending the main flexible blades 61, 62, 63, the movable element 26 can move relative to the support 72 in a rotary motion about itself around a centre of rotation. The main blades 61, 62, 63 are preferably of the same length and angularly distributed evenly about a central part of the movable element 26, so as to form a symmetrical pivot.

The flexible guide 40 comprises main translation tables 64, 65, 66, each translation table being joined to one end of a different main flexible blade 61, 62, 63. In this embodiment, the main translation table 64, 65, 66 is arranged in series between the fixed support 72 and said corresponding main flexible blade 61, 62, 63. The main translation table 64, 65, 66 is joined to the fixed support 72 and to a first end of the corresponding main flexible blade 61, 62, 63, the main flexible blade 61, 62, 63 being joined to the movable element 26 by a second end.

Thus, the flexible guide 40 comprises three pairs, each pair consisting of a main flexible blade 61, 62, 63 and a main translation table 64, 65, 66. The pairs are angularly distributed so as to form a symmetrical pivot, each main blade 61, 62, 63 being joined at one end to the movable element 26 and the translation table 64, 65, 66 being joined to the fixed support 72. The pairs, in particular the main blades 61, 62, 63, form an angle of about 120° with one another.

Each main translation table 64, 65, 66 is configured to move in translation at least in part under the effect of the motion of the main flexible blade 61, 62, 63. Each main translation table 64, 65, 66 comprises at least one secondary flexible blade, in this case two secondary flexible blades, and a rigid part. The secondary flexible blades are substantially parallel and are disposed in different rows. Preferably, the secondary flexible blades are joined at one end to the same face of the rigid part and at another end to the fixed support 72. In this case, the rigid part forms a U-shaped bend, the bend including three segments 121, 122, 123. The main flexible blade 61, 62, 63 is joined to the first segment 123, whereas the secondary blades are joined to the second segment 122. Thus, the main flexible blades 61, 62, 63 are substantially perpendicular to the secondary flexible blades of the translation table 64, 65, 66 when the guide 40 is in the rest position. The rest position is defined as being when the main blades 61, 62, 63 and the secondary blades are straight, i.e. not bent.

Moreover, the flexible guide 40 comprises at least one secondary translation table 67, 68, 69, arranged in series between two main translation tables 64, 65, 66. In FIG. 5, the flexible guide 30 comprises three secondary translation tables 67, 68, 69. Each secondary translation table 67, 68, 69 is disposed between two translation tables 64, 65, 66.

Each secondary translation table 67, 68, 69 is connected to two main translation tables 64, 65, 69 by a tertiary flexible blade 73, 74, 75, 76, 77, 78. A tertiary flexible blade 73, 74, 75, 76, 77, 78 connects a main translation table 64, 65, 69 to a secondary translation table 67, 68, 69. A secondary translation table 67, 68, 69 comprises two quaternary flexible blades and a rigid part, the quaternary flexible blades being joined to the rigid part of the secondary translation tables 67, 68, 69 and to the support 72. The rigid part in this case has a parallelepiped shape, which is oriented towards the centre of the flexible guide 40. The flexible guide 40 comprises tertiary flexible blades 73, 74, 75, 76, 77, 78 connecting the secondary translation tables 67, 68, 69 to the main translation tables 64, 65, 69. Each tertiary flexible blade 73, 74, 75, 76, 77, 78 connects a secondary translation table 67, 68, 69 to an adjacent main translation table 64, 65, 69. The tertiary flexible blades 73, 74, 75, 76, 77, 78 are joined to the rigid part of the translation tables, preferably to the third segment 121 of the rigid part perpendicular to the main flexible blades 61, 62, 63 The tertiary flexible blades 73, 74, 75, 76, 77, 78 are substantially of equal length. Each secondary translation table 67, 68, 69 is arranged equidistant from the two main translation tables 64, 65, 69 to which it is joined.

Figure 6:
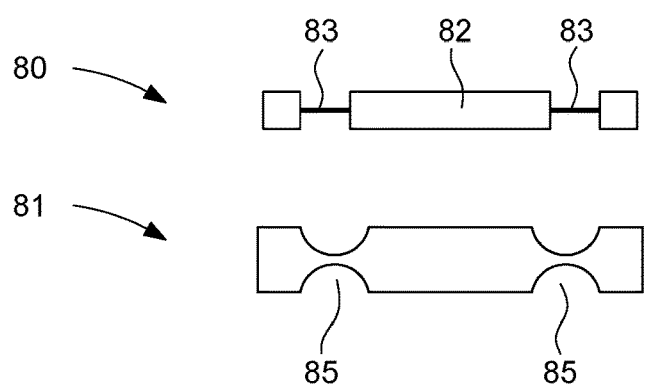
FIG. 6 is a diagrammatic, overhead view of two alternative embodiments of flexible blades according to the invention.

In the figures showing the different embodiments, the flexible blades are flat blades. However, the flexible blades can also comprise thicker or thinner parts, or can comprise necks, such as those shown in FIG. 6. Thus, the top blade 80 comprises a thicker part 82 in the middle, which is more rigid, and thinner parts 83 at the ends. The bottom blade 81 is thick throughout the length 84 thereof, but comprises two necks 85 that are thinned at the ends to allow the blade 81 to flex.

Figure 7:
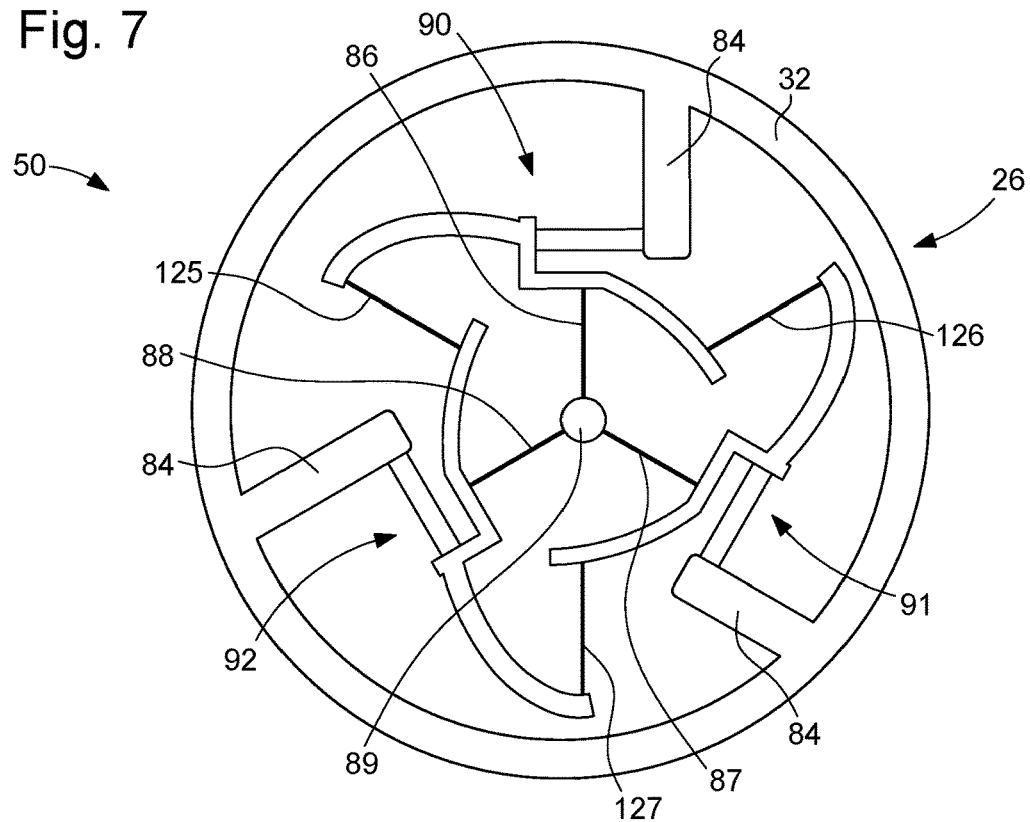
FIG. 7 is a diagrammatic, overhead view of a flexible guide according to a sixth embodiment of the invention.
Figure 8:
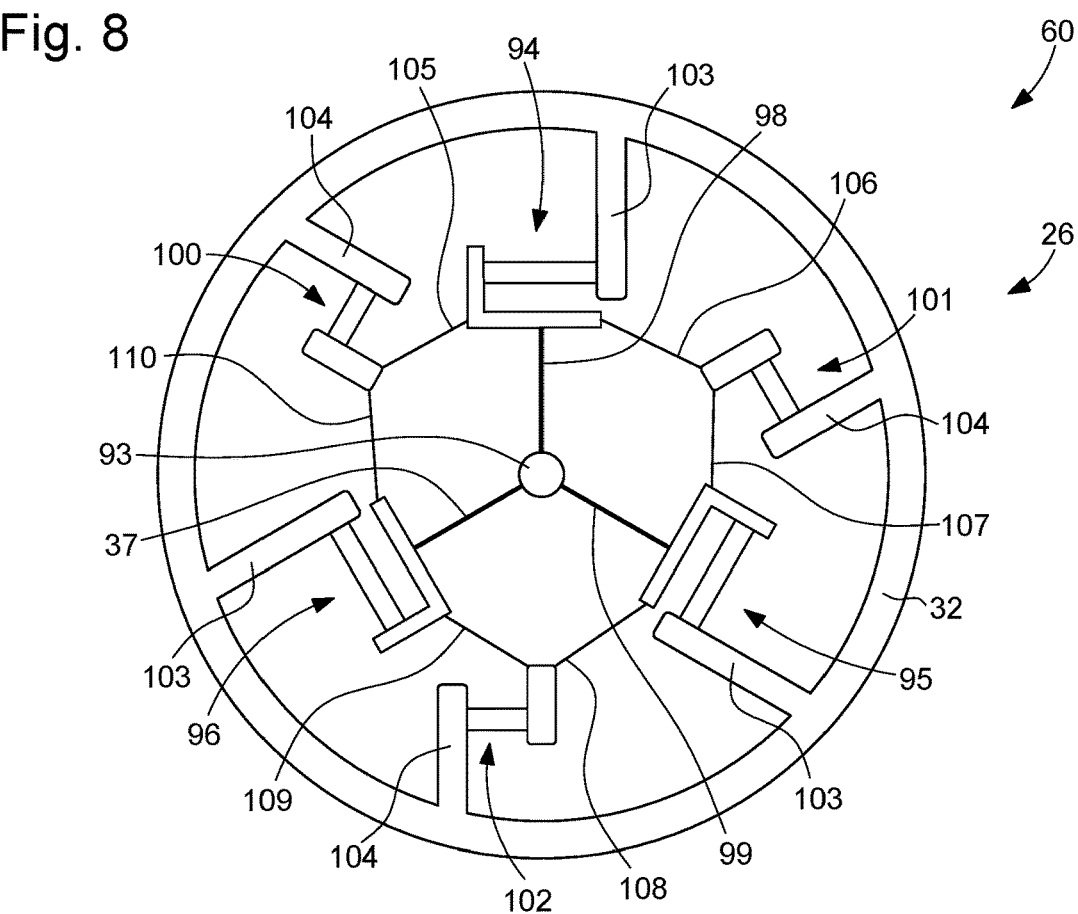
FIG. 8 is a diagrammatic, overhead view of a flexible guide according to a seventh embodiment of the invention.

In the embodiments shown in FIGS. 7 and 8, the fixed support comprises the central part 89, 93 to which the first ends of the main flexible blades are joined, whereas the translation tables are joined to the movable element.

In FIG. 7, the sixth embodiment of the flexible guide 50 is similar to the flexible guide 1 in FIG. 2, with the difference that the secondary blades of the main translation tables 90, 91, 92 are joined to the movable element 26, whereas the main blades 83, 84, 85 are joined on the one hand to the central part of the fixed support 82, and on the other hand to the rigid part of the main translation tables 90, 91, 92. The tertiary flexible blades 125, 126, 127 are arranged in series between the main translation tables 90, 91, 92 in the same configuration as that of the second embodiment. The central part 89 also takes the shape of a circular cylindrical portion. Preferably, the movable element 32 includes inner extensions 84 oriented in the plane towards the inside of the ring, to allow for the assembly of the secondary flexible blades of each translation table 90, 91, 92. The extensions 84 extend in a direction substantially parallel to the direction of the main flexible blades 86, 87, 88 when in the rest position, such that the secondary flexible blades of each translation table 90, 91, 92 are directed perpendicular to this direction. Thus, the secondary flexible blades are substantially perpendicular to the direction of the main flexible blades 86, 87, 88 for the same pair. In this embodiment, the translation tables 90, 91, 92 are not directly joined to the fixed support 89, but to the movable element 26.

In the seventh embodiment shown in FIG. 8, the flexible guide 60 is similar to the flexible guide 30 in FIG. 4, with the difference that the secondary blades of the main translation tables 94, 95, 96 are joined to the movable element 26, whereas the main blades 97, 98, 99 are joined on the one hand to the central part of the fixed support 93, and on the other hand to the rigid part of the main translation tables 94, 95, 96. The tertiary flexible blades 105, 106, 107, 108, 109, 110, 111 are arranged in series between the main translation tables 90, 91, 92 and the secondary translation tables 100, 101, 102 in the same configuration as that of the fourth embodiment. The central part of the support 93 also takes the shape of a circular cylindrical portion. Preferably, the movable element 32 includes inner extensions 103, 104 oriented in the plane towards the inside of the ring, to allow for the assembly of the secondary and quaternary flexible blades of the main translation tables 94, 95, 96 and of the secondary translations tables 100, 101, 102. The extensions 103, 104 extend in a direction substantially parallel to the direction of the main flexible blades 97, 98, 99 when in the rest position, such that the secondary flexible blades of the main translation tables 94, 95, 96 are directed perpendicular to this direction. Thus, the secondary flexible blades are substantially perpendicular to the direction of the main flexible blades 97, 98, 99. In this embodiment, the translation tables 97, 98, 99, 100, 101, 102 are not directly joined to the fixed support 93, but to the movable element 32.

The invention further relates to a resonator mechanism, in particular for a horological movement, not shown in the figures. The resonator mechanism is provided with a flexible guide according to one of the embodiments described hereinabove.

It goes without saying that the invention is not limited to the embodiments described with reference to the figures and alternatives can be considered without leaving the scope of the invention. In particular, a greater or lesser number of pairs consisting of a main flexible blade and a translation table than the examples described can be considered.

The invention claimed is:

1. A flexible guide for a rotating resonator mechanism, the guide comprising a fixed support, an element that is capable of moving relative to the fixed support, at least two main flexible blades allowing the movable element to move relative to the fixed support by bending the main flexible blades via a rotary motion about a centre of rotation, the flexible guide being arranged substantially in one plane, said flexible guide comprising at least two translation tables, each joined to one end of a main flexible blade, such that each translation table is configured to move in translation at least in part under the effect of the bending of the corresponding main flexible blade, the flexible guide comprising at least one tertiary flexible blade connecting the two translation tables.

2. The flexible guide according to claim 1, further comprising at least three pairs, each pair being formed by a main blade and a translation table, the pairs being angularly distributed so as to form a symmetrical pivot, the guide comprising at least two tertiary flexible blades, connecting two translation tables.

3. The flexible guide according to claim 1, wherein each translation table is arranged in series between the fixed support and said corresponding main flexible blade, the translation table being joined to the fixed support and to a first end of the main flexible blade, the main flexible blade being joined to the movable element at a second end.

4. The flexible guide according to claim 1, wherein each translation table is arranged in series between said corresponding main flexible blade and the movable element, the translation table being joined to the movable element and to the second end of the main flexible blade, the main flexible blade being joined to the fixed support at the first end.

5. The flexible guide according to claim 3, wherein the movable element comprises a central part of the flexible guide.

6. The flexible guide according to claim 4, wherein the fixed support comprises a central part of the flexible guide.

7. The flexible guide according to claim 1, wherein a main translation table comprises at least one secondary flexible blade, and a rigid part, the secondary flexible blade being joined at one end to the rigid part and at another end either to the fixed support or to the movable element.

8. The flexible guide according to claim 1, further comprising at least one secondary translation table arranged in series between two main translation tables, each secondary translation table being connected to said two main translation tables by one tertiary flexible blade per main translation table.

9. The flexible guide according to claim 8, wherein the secondary translation table comprises a quaternary flexible blade, and a rigid part, the quaternary flexible blade being joined to the rigid part of the secondary translation table at one end and at another end either to the fixed support or to the movable element.

10. The flexible guide according to claim 1, wherein the tertiary flexible blades are joined to rigid parts of the two translation tables connected thereby.

11. The flexible guide according to claim 10, wherein the rigid part forms a bend such that the one or more main flexible blades are substantially perpendicular to the one or more secondary flexible blades of the translation table joined to the main flexible blade when the guide is in the rest position.

12. The flexible guide according to claim 1, wherein the movable element comprises a balance.

13. A rotating resonator mechanism comprising a flexible guide comprising a fixed support, a movable element capable of moving relative to the fixed support, at least two main flexible blades allowing the movable element to move relative to the fixed support by bending the main flexible blades via a rotary motion about a center of rotation, the flexible guide being arranged substantially in one plane, said flexible guide comprising at least two translation tables, each joined to one end of a main flexible blade, such that each translation table is configured to move in translation at least in part under the effect of the bending of the corresponding main flexible blade, the flexible guide comprising at least one tertiary flexible blade connecting the two translation tables.

* * * * *